US005485981A

United States Patent [19]

Lindahl

[11] Patent Number: 5,485,981

[45] Date of Patent: Jan. 23, 1996

[54] MOTOR MOUNT ASSEMBLY FOR FLOAT TUBE

[76] Inventor: Gregory J. Lindahl, 1614 Montana Ave., Gladstone, Mich. 49837

[21] Appl. No.: 285,337

[22] Filed: Aug. 2, 1994

[51] Int. Cl.[6] .......... F16M 1/00

[52] U.S. Cl. .......... 248/641; 114/345; 440/900

[58] Field of Search .......... 248/640, 641, 248/642, 643; 440/61, 53, 900; 114/343, 345

[56] References Cited

U.S. PATENT DOCUMENTS

| | | | |
|---|---|---|---|
| D. 323,509 | 1/1992 | Dimmitt | D15/4 |
| 2,150,420 | 3/1939 | Cooper | 248/641 |
| 2,334,072 | 11/1943 | Cooper | 114/345 |
| 2,468,287 | 4/1949 | Bohler | 248/640 |
| 2,497,490 | 2/1950 | Daniels | 114/345 |
| 2,930,341 | 3/1960 | Gaston | 248/641 X |
| 3,638,256 | 2/1972 | McIntyre | 248/641 X |
| 3,881,442 | 5/1975 | Seiple | 115/5 B |
| 4,371,144 | 2/1983 | Godlewski | 248/641 |
| 4,449,473 | 5/1984 | McCrory et al. | 114/354 |
| 4,596,529 | 6/1986 | Goodman | 440/6 |
| 4,690,649 | 9/1987 | Zeimet | 440/900 X |
| 4,823,725 | 4/1989 | Smith | 114/343 |
| 4,890,811 | 1/1990 | Ehni | 440/61 X |
| 5,382,183 | 1/1995 | Rompre | 440/59 |
| 5,389,017 | 2/1995 | Huzjak | 440/53 |

FOREIGN PATENT DOCUMENTS

| | | | |
|---|---|---|---|
| 146666 | 8/1961 | U.S.S.R. | 248/640 |

*Primary Examiner*—J. Franklin Foss

*Attorney, Agent, or Firm*—Mueller and Smith

[57] ABSTRACT

A motor mount assembly is provided for supporting an outboard motor upon a float tube of the type having a backrest pocket, and generally consists of a thrust transfer member, first and second suspension members, and a motor mounting block. The thrust transfer member is dimensioned in correspondence with a pocket cavity within the backrest pocket for insertion and retention therein. Attachable to the thrust transfer member are the first and second suspension members which are couplable with the motor mounting block assembly. The motor mount assembly is securely attachable to the float tube for receiving and supporting the outboard motor.

19 Claims, 2 Drawing Sheets

MOTOR MOUNT ASSEMBLY FOR FLOAT TUBE

BACKGROUND OF THE INVENTION

Inflatable boats, rafts, inner-tubes and the like find diverse usage in various aquatic environments. Float tubes, in particular, have a variety of applications from purely recreational enjoyment to use by avid sportsmen and outdoorsmen. Popularity is partly due to the fact that float tubes offer many amenities otherwise associated with boats and inflatable water craft, yet employ a light and portable structure easily manageable by a single user.

Float tubes are frequently used by fishermen as a practical alternative to boats. In this regard, float tubes generally are selected over boats since they are lightweight, easily transportable, typically, being designed to support a single user. Most of the float tubes have a standard backrest pocket and optionally are available with accessories, such as multiple side storage pockets for accommodating fishing gear.

Ponds, lakes, streams, and other fishing spots selected by sport fishermen often are not easily or directly accessible. In these instances, all gear, usually including fishing nets, tackle boxes, stringers, fishing poles, bait, and other provisions, must be carried to the remote fishing location. Transporting a boat to such locations can be burdensome and in some instances impossible for an individual, as even small aluminum craft, not including motor, fuel, oars, anchor, life preservers, etc., can weight several hundred pounds.

In many instances fishing without a boat may not be desirous in that the number of fishable locations is often restricted to shallower depths or those areas reachable by foot or casting. Likewise, some fishing methods requiring a boat, such as trolling, still fishing, drift fishing, or jigging may be desired or necessary to obtain a successful catch. In this regard again, float tubes are advantageous in that anglers can maneuver to various locations on the water and use the float tube much like a conventional boat.

Float tubes are employed in other applications outside fishing as well. As an example, outdoorsmen or others seeking to enjoy nature may use float tubes to observe nature or wildlife. Such observation, often, must necessarily be unobtrusive or must occur in a remote location, making boats and other heavier water craft impractical. Additionally, the use of float tubes is advantageous in that, relatively, they maintain environmental integrity since wildlife is not disturbed from pollutants and noise otherwise associated with a craft using a combustion motor.

Presently, float tube use is restricted in that users are called upon to maneuver the devices using their legs or hands in a swimming fashion. Typically, a swim "kick" is employed in conjunction with foot fins. Small paddles also may be used. These methods have apparent drawbacks. In this regard, swim fins are quite awkward as the user stands upon the bottom surface in shallower regions to walk. Additionally, users may be unable to cover long distances without a substantial physical exertion. A fisherman may be required to traverse a lake or large body of water to reach a favorite fishing hole. Similarly, certain wildlife habitation may exist only in more remote wilderness areas. Presently, users have to paddle or kick to the location and then return, possibly an unmanageable distance.

Even in instances where users could physically paddle or kick to the chosen locations, manpowered transportation is not always feasible. For instance, fish tend to migrate and follow the movement and supply of the food chain, such as minnows, insects, and smaller fish. Fishermen, however, may be unwilling or unable to paddle and kick about following or searching for fish. As another example, a fisherman attempting to troll would be required to hold his pole in one hand while continuously paddling or kicking at a relatively consistent speed.

At present, float tube users would welcome a device which enhances the float tube's method of transportation yet maintains it advantages of light weight, portability, and environmental appropriateness.

SUMMARY

The present invention is addressed to a motor mount assembly, float tube system, and method of transporting a person on a body of water. With the invention, float tube users can travel greater distances and access locations not otherwise available without a boat. In this regard, the mount assembly and float tube are particularly suited for fishing and offer flexibility in alternative fishing methods and permit a greater access to fishing locations. Cumbersome equipment heretofore typically associated with boats and other motorized craft, however, is not present, as the float tube and mount assembly are light weight and transportable by a single user. As an additional advantage, the mount assembly is attachable with various float tube designs employing a backrest pocket and is easily mounted thereto.

Float tubes of the type having a backrest pocket may be employed with the present motor mount assembly invention, which generally consists of a thrust transfer member, first and second suspension members, and a motor mounting block assembly. The thrust transfer member is dimensioned in correspondence with a pocket cavity within the backrest pocket for insertion and retention therein. Attachable to the thrust transfer member are first and second suspension members which, in turn, are couplable with the motor mounting block assembly. The motor mount assembly is securely attachable to the float tube, and thereafter, an outboard motor of the type having a mounting clamp can be mounted on a clamp receiving portion of the motor mourning block.

As another feature, the thrust transfer member is formed having a buoyancy effective to maintain the mount assembly and motor afloat in water. Further, motor mount materials may be selected so as to greatly minimize manufacture and subsequent retail costs.

Other objects of the invention will, in part, be obvious and will, in part, appear hereinafter. The invention, accordingly, comprises the apparatus, method, and system possessing the construction, combination of elements, and arrangements of parts which are exemplified in the following detailed disclosure.

For a fuller understanding of the nature and objects of the invention, reference should be had to the following detailed description taken in connection with the accompanying drawings.

DETAILED DESCRIPTION OF THE INVENTION

Figure 1:
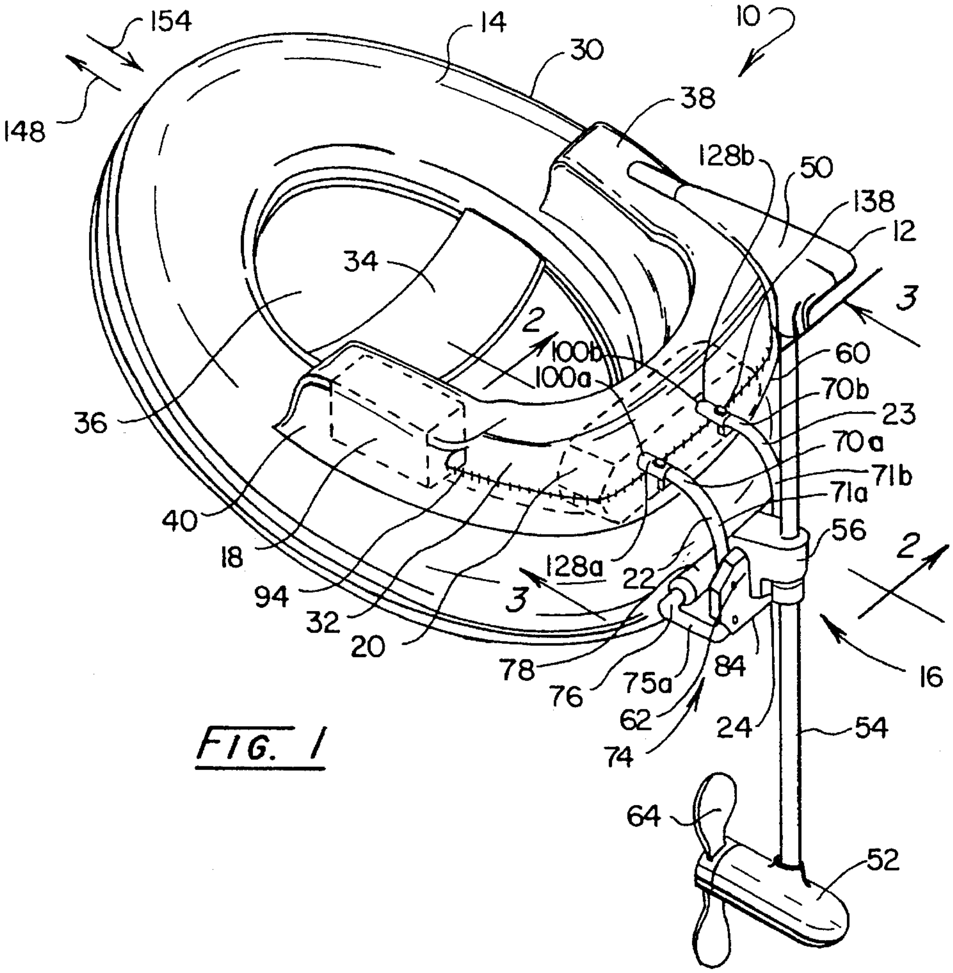
FIG. 1 is a perspective view of a motor mount assembly according to the invention attached to a float tube with an outboard motor mounted thereon.

Looking to FIG. 1, a motorized float tube system according to the invention is shown generally at 10 to include an outboard motor 12, a float tube 14, and a motor mount assembly 16. Assembly 16 consists of a thrust transfer member 20, first and second suspension members shown, respectively, at 22 and 23, and a motor mounting lock 24. Mount assembly 16 is securely attachable to float tube 14 for receiving and supporting outboard motor 12. Thus configured, system 10 offers optional motorized mobility to float tube 14. With this system, float tube users can access locations on ponds, lakes, streams, and the like not otherwise accessible without a boat. The float tube feature of single person use is retained inasmuch as the motor 12, shown as an electric fishing type, with battery 18, is lightweight, weighing approximately 24 lbs. The entire system typically weights about 30 lbs. Particular application of the system 10 will be found in fishing since the motorized float tube offers the advantages associated with fishing from a boat, such as flexibility in alternative fishing methods, and greater access to fishable locations.

Float tubes are generally configured in a circular or horseshoe fashion and, depending on a particular style, may have numerous accessories, such as added storage pockets. As a standard feature, though, these tubes are configured having a backrest pocket. Motor mount assembly 16 is employed with a float tube having a pocket adapted to receive and retain thrust transfer member 20. FIG. 1 depicts one such float tube 14 to be circularly configured with an outer tube portion 30 and a backrest portion 32. Float tubes of this design can support a single user with gear which typically may weigh up to about 225 lbs. A user support band 34 spans a central open area 36 of the tube 14. This support band 34 typically will be configured to include a quick release buckle (not shown). Once system 10 is afloat in water, the user sits on support band 34 facing away from backrest portion 32. Backrest portion 32 is inflatable with tube 14 and provides a convenient user back or head support. Side pockets 38 and 40 commonly are available as water resistant storage compartments for gear, provisions, and the like.

Outboard motor 12 may be of various types and is shown to include a top hand guidance and speed control handle 50, bottom motor and gear housing propulsion portion 52, a shaft 54 extending therebetween, and a mounting clamp 56. In order to minimize the overall structural weight of system 10 and meet weight support limitations associated with float tube 14, motor 12 preferably is electrically powered, having a rechargeable storage battery 18 connected thereto via cable 60. Motor 12 can, for example, be up to a 32 lb. thrust guide type motor using a 32 ampere deep cycle liquid gel sealed storage battery.

Figure 2:
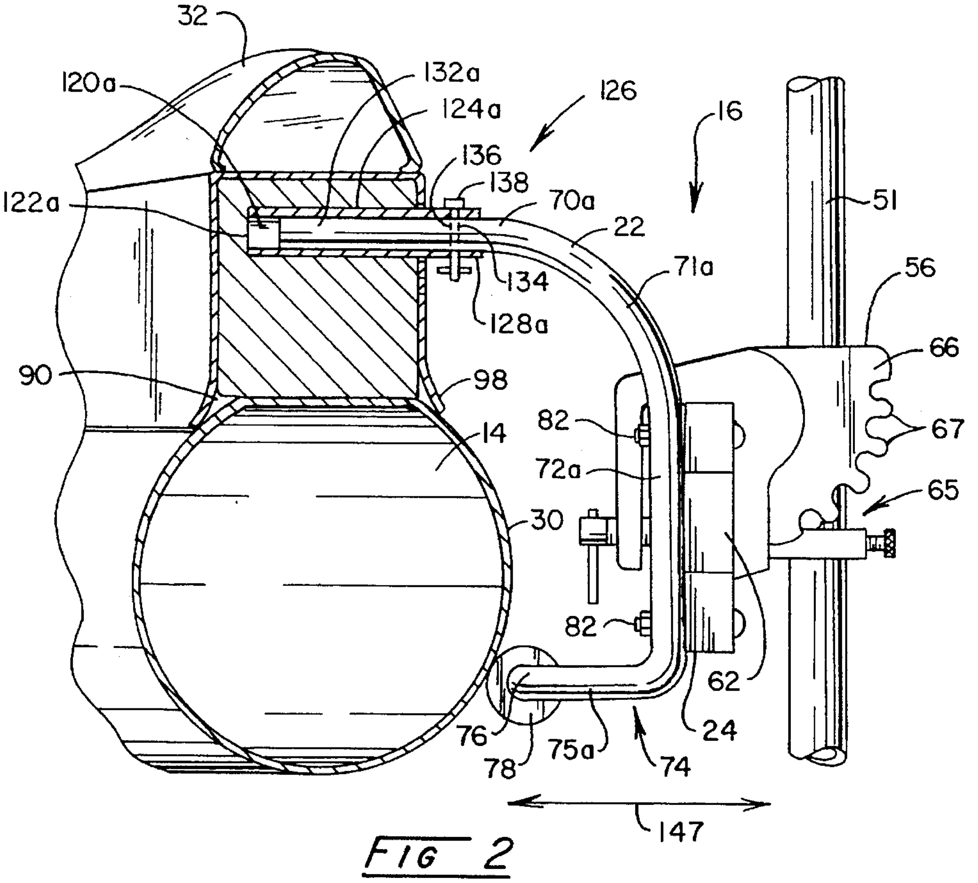
FIG. 2 is a partial sectional view of FIG. 1 taken through plane 2—2 thereof.

Motor 12 is provided having a clamp form of connector which is intended for connection with a boat. Such a clamp connector is shown at 56 in FIGS. 1 and 2 in removable attachment with mounting block 24. This mounting block 24 consists of a single, flat plate made of wood, plastic, or the like, and preferably has dimensions 10 in.×5 in.×0.75 in. Mounting clamp 56 of motor 12 is connected to a clamp receiving portion 62 of mounting block 24 and tightened thereto by a clamp mechanism 65 (FIG. 2). A head portion 66 with a plurality of receptor notches 67 is provided to selectively adjust the angular orientation of shaft 54. Battery 18 is stored in a float tube pocket, such as side pocket 40, or otherwise mounted on outer tube portion 30. During motor operation, users select a motor speed and thereafter steer float tube 14 by maneuvering handle 50 which correspondingly turns bottom propulsion portion 52 and a propeller 64 which is driven therefrom. Users may continue to wear scuba fins or carry paddles which can be used to aid in steering, or for quiet movement, for example, when motor 12 is not in use.

Looking in particular to FIG. 2, first and second suspension members 22 and 23 are seen to have a generally curved configuration in order to vertically position motor 12 and accommodate thrust transfer from it to float tube 14. Each of the members 22 and 23 includes a horizontally disposed coupling portion shown, respectively, at *70a*, *70b* which extends outwardly from backrest portion 32. Members 22 and 23 arc downwardly from portion *70a*, *70b* along a curved portion *71a*, *71b*, forming substantially a 90° transition. From this transition, members 22 and 23 provide a vertically disposed thrust transfer portion *72a*, *72b* to which mounting block 24 is attached. Below the thrust portion *72a*, *72b*, members 22 and 23 are united to form a lower bracket assembly shown generally at 74. Assembly 74 includes horizontally disposed, generally outwardly extending continuing portion *75a*, *75b* of members 22 and 23 which are joined together to define a horizontal lower abutting bar represented generally at 76. Lower bar 76 optionally may have a foamaceous rubber or polymer cylindrical cushion 78. Assembly 74 can be formed integrally with members 22 and 23 to provide a unitary suspension assembly or can be removably connected thereto, using, for example, 0.5 in. diameter plastic fittings. Members 22 and 23 are preferably formed of aluminum piping or other such lightweight material with individual lengths of approximately 18.5 in.

Attachment of motor mounting block 24 to thrust transfer portion *72a*, *72b* is revealed in FIGS. 1 and 2. Mounting block 24 is coupled to these portion *72a*, *72b* with a bolt and nut arrangement, the components of which are universally identified at 82. Preferably, this arrangement 82 consists of four brass 2 in.×0.25 in. part head bolts with nuts and washers, each being spaced inwardly approximately 2 in. from the outer periphery 84 of motor mounting block 24.

Figure 3:
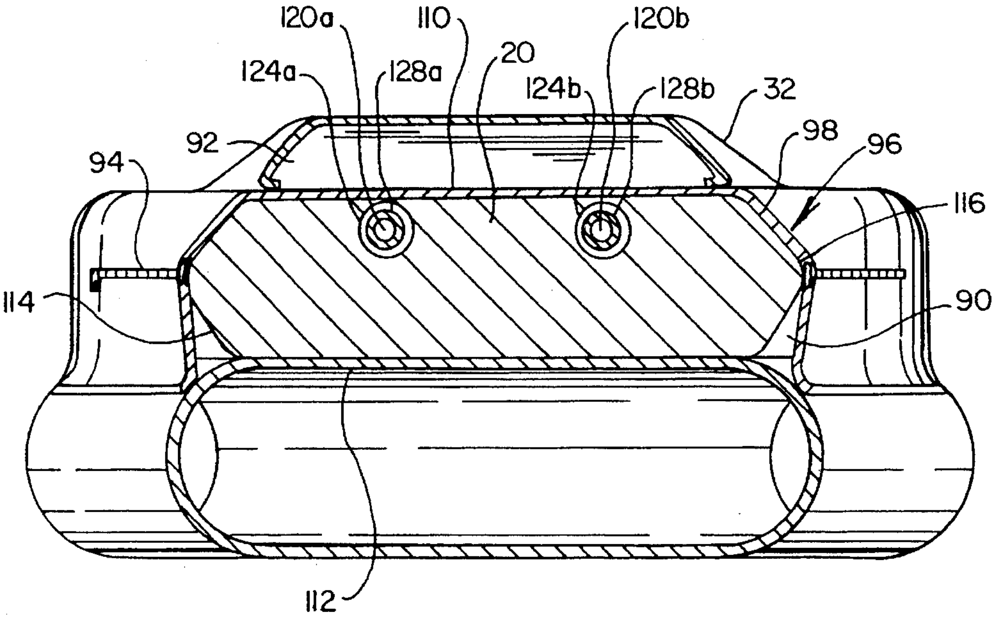
FIG. 3 is a partial sectional view of the backrest assembly of FIG. 1 taken through plane 3—3 thereof.

Turning also to FIG. 3, backrest portion 32 is seen to be formed having an inner pocket or auxiliary cavity 90 and air pocket cavity 92 inflatable with float tube 14. Pocket cavity 90 is acessible via a zipper 94 extending along a rearward portion 96 of backrest portion 32. A closing flap 98 extends over zipper 94 and retains thrust transfer portion 20 within pocket cavity 90 and transfers thrust during motor operation to backrest portion 32 and tube portion 30. Additionally, flap 98 serves to guard against water penetration therethrough. Two openings *100a*, *100b* also are shown circularly cut in flap 98 (FIG. 1).

Float tubes typically are sold with a head rest component (not shown) which fits within pocket cavity 90. In FIG. 3, this head rest has been removed and replaced by thrust transfer member 20, which is dimensioned to fit securely within pocket cavity 90. This dimension generally corresponds with the size of pocket cavity 90 which, in turn, stabilizes positioning and restricts movement of thrust transfer member therein. In this regard, thrust transfer member 20 generally has a flat top and bottom surface 110 and 112, respectively, and two rounded ends 114 and 116. Thrust transfer member 20 is formed of a material having a buoyancy effective to maintain outboard motor 12, suspension members 22 and 23, and motor mounting block 24 afloat in water. This material, for example, may be cork, wood, plastic, or foam polymer, such as polystyrene.

Looking also to FIG. 2, thrust transfer member 20 has two cylindrically configured receiving channels *120a*, *120b* extending inwardly. These channels *120a*, *120b* each have a corresponding end *122a*, *122b* terminating within thrust transfer member 20 and an opening *124a*, *124b* facing horizontally outwardly therefrom. Common dimensions for thrust transfer member 20 are 21 in.×5 in.×5 in. Receiving channels 120*a*, 120*b*, preferably, have a 1 in. diameter, are located approximately 7.5" from each end 114 and 116, respectively, and have a depth of 4 in extending from openings 124*a*, 124*b* to ends 122*a*, 122*b*.

Coupling between coupling portions 70*a*, 70*b* and thrust transfer member 20 is revealed in FIGS. 2 and 3. In this regard, each coupling portion 70*a*, 70*b* engages and connects to thrust transfer member 20 at an attachment and receiving portion shown generally at 126. This attachment and receiving portion 126 consists of guideways 128*a*, 128*b*, respectively, configured as open ended tubes of predetermined internal diameter fixed, for example by glue, within receiving channels 92*a*, 92*b*. As shown, when thrust transfer member 20 is operatively positioned within pocket cavity 90, each guideway extends outwardly from openings 124*a*, 124*b* and through openings 100*a*, 100*b* cut in flap 98.

Each coupling portion 70*a*, 70*b* has an end attachment portion 132*a*, 132*b* which is configured of tubing having an outside diameter less than the internal diameter of a corresponding guideway 128*a*, 128*b*. End attachment portions 132*a*, 132*b* are dimensioned to be slidably received and interconnected with guideways 128*a*, 128*b* to prevent slidable movement occasioned by thrust transfer during motor operation which is exhibited in a direction outwardly from or inwardly toward backrest portion 32. Each end attachment portion 132*a*, 132*b* and each guideway 128*a*, 128*b* additionally has an opening, one such opening shown in FIG. 2 at 134. Openings 134, for example, can be provided as similarly dimensioned holes bore through guideways 128*a*, 128*b* and end attachment portions 132*a*, 132*b*. Once an opening 134 in both end attachment portions 132*a*, 132*b* and guideways 128*a*, 128*b* is aligned, a drop pin and cotter key clip assembly 138 may be placed therethrough to maintain alignment and engagement of suspension members 22 and 23 within thrust transfer member 20. Additionally, end attachment portions 132*a*, 132*b* and guideways 128*a*, 128*b* may have several such openings 134, each alignable with a corresponding oppositely disposed opening to vary or adjust the distance end attachment portions 132*a*, 132*b* extend into receiving channels 120*a*, 120*b*. In this regard, motor mount assembly 16 may be attached with float tubes having various tube portion diameters, yet maintain a vertical orientation of shaft 54, as in FIG. 2. This connection also is such that suspension members 22 and 23 may be removably connected to thrust transfer member 20, as for example during attachment or removal of motor mount assembly 16 to float tube 14.

Arc transitions 71*a*, 7*b* of respective suspension members 22 and 23 are particularly suited for positioning motor 12 and transferring thrust to float tube 14. In this regard, in spite of a relatively light weight associated with inflatable float tubes, when motor mount assembly 16 and outboard motor 12 are mounted, float tube 14, left undisturbed, maintains a static balance while afloat in quiescent water. This stability results, in part, from a counterbalancing by the weight of battery 18 at its more forward position. As shown in FIG. 1, battery 18 may be positioned in an auxiliary pocket located on tube portion 30, for example side pocket 40, or alternatively in a harness (not shown) which is moveably attachable around tube portion 30.

Figure 4:
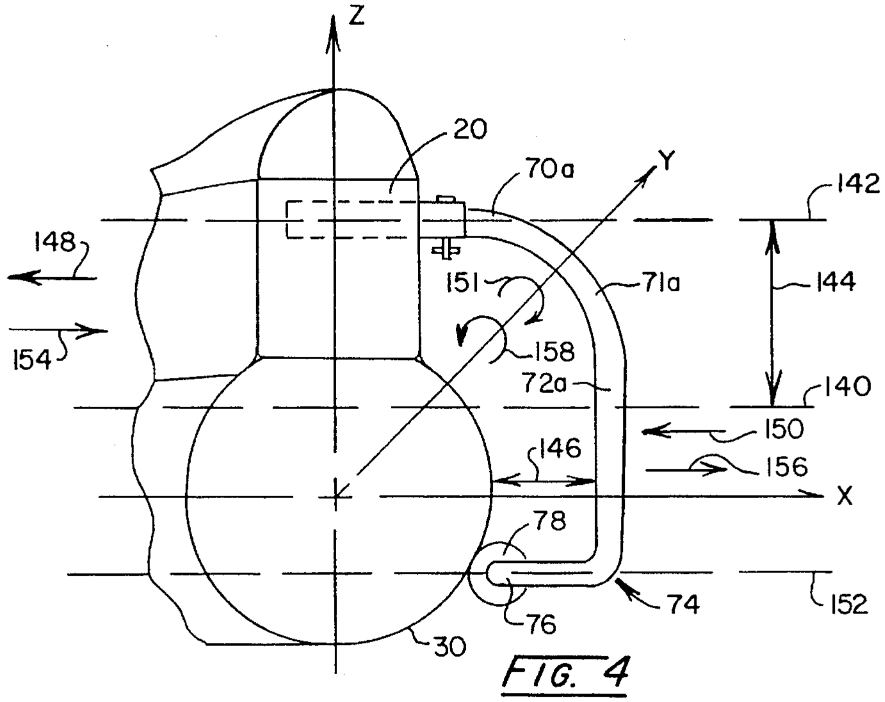
FIG. 4 is a schematic view similar to that of FIG. 2.

Stability also results from the weight distribution characteristics of suspension members 22 and 23 under load transfer conditions to float tube 14. Turning to FIG. 4, a schematic view of float tube system 10 illustrates aspects of this configuration using an x-y-z coordinate system for reference. Mounting of motor 12 (FIG. 2) occurs at thrust transfer portions 72*a*, 72*b* which are generally along a horizontal plane parallel with the x-axis, shown by dashed line 140. Line 140, however, is vertically displaced a distance 144 from a horizontal plane of attachment, line 142, where coupling portions 70*a*, 70*b* and thrust transfer member 20 couple. Looking also to FIGS. 1 and 2, this displacement distance 144 allows bottom propulsion portion 52 of motor 12 to be disposed in a water depth sufficient to accommodate standard motor shaft length sizes.

Further, due to are transitions 71*a*, 7*b*, attachment of motor 12 on mounting block 24 occurs away from float tube 14 a distance 146. Distance 146, in turn, provides a clearance spacing 147 (FIG. 2) from tube 14 to shaft 54. Clearance spacing 147 enables motor 12 to freely rotate during float tube steering and maneuvering. Additionally, as a safety measure, spacing 147 sufficiently places bottom propulsion portion 52 away from float tube 14 such that a user sitting across support band 34, during normal operation, cannot reach propeller 64 with a foot or scuba fin.

The configuration of suspension members 22 and 23 also serves to effectively transfer thrust produced by motor 12 to float tube 14 during motor operation. Additionally, since float tubes are maneuverable in both a forward and reverse direction, suspension members 22 and 23 are configured for outboard motors capable of dual directional use. Turning to FIGS. 1 and 4, when float tube 14 is being motorized in a generally forward direction, shown by line 148 along the negative x-axis, motor 12 exerts a forward vector or pushing force 150 on thrust transfer portions 72*a*, 72*b*. This forward force 150, in turn, is transferred through coupling portions 70*a*, 70*b* and bracket assembly 74 to float tube 14. Thrust transfer from bracket assembly 74 occurs from lower abutting bar 76 to outer tube portion 30. Preferably, this trust transfer is along a horizontal plane 152, proximate to the center line of float tube 14, shown along the x-axis. Dual thrust transfer along both plane 152 and at coupling portions 70*a*, 70*b* provides efficient thrust transfer to float tube 14 and aids in maintaining its stability during motorized operation. In this regard, bracket assembly 76, and in particular lower bar 76, minimize a torquing moment 151 exhibited on thrust transfer member 20 about the y-axis.

Force transfer conditions also are shown in the figure for conditions when float tube 14 is operated in a reverse direction, illustrated by line 154 along the positive x-axis. In this instance, motor 12 exerts a reverse vector or pulling force 156 on thrust transfer portions. 72*a*, 72*b*. This reverse force 156, in turn, is transferred through coupling portions. 70*a*, 70*b* to float tube 14. Correspondingly, due to a torquing moment 158 about the y-axis, thrust is transferred downwardly in the negative z-direction upon thrust transfer member 20 and float tube 14. In turn, thrust is distributed onto the float tube 14 generally along a vertical center line along the z-axis to maintain stability during reverse motorized movement.

Since certain changes may be made in the above apparatus without departing from the scope of the invention herein involved, it is intended that all matter contained in the above description or shown in the accompanying drawings shall be interpreted as illustrative and not in a limiting sense.

I claim:

1. A motor mount assembly for supporting an outboard motor of a variety having a mounting clamp and given operational thrust upon a float tube having a backrest portion with a pocket cavity of given widthwise dimension and a closing flap, and a tube portion, comprising:

a thrust transfer member dimensioned in correspondence with said pocket cavity for insertion and retention therein having two spaced apart receiving channels with openings facing horizontally outwardly from said pocket cavity when said thrust transfer member is operatively positioned within said pocket cavity;

first and second suspension members each having a coupling portion slidably insertable within one of said receiving channels, and a thrust transfer portion depending downwardly therefrom; and a motor mounting block coupled with said first and second suspension members at said thrust transfer portion thereof, and having an upwardly disposed clamp receiving portion for receiving said mounting clamp.

2. The motor mount assembly of claim 1 in which said thrust transfer member is formed having a buoyancy effective to maintain said first and second suspension members, said motor mounting block, and said outboard motor afloat in water.

3. The motor mount assembly of claim 2 in which said thrust transfer member is formed of a material selected from the group comprising foam polymer, cork, and wood.

4. The motor mount assembly of claim 1 in which said thrust transfer member is dimensioned to be fully enclosed within said pocket cavity and retained therein against said outboard motor thrust.

5. The motor mount assembly of claim 1 in which:

said thrust transfer member two receiving channels each include a guideway extendable through said closing flap when said thrust transfer member is operatively positioned within said pocket cavity; and said first suspension member coupling portion and said guideway of said receiving channel within which it is slidably oriented are configured for interconnection preventing slidable movement therebetween occasioned by said thrust exhibiting a direction outwardly from said backrest portion.

6. The motor mount assembly of claim 5 in which:

each said guideway is an open ended tube of predetermined internal diameter fixed to said thrust transfer member and extendable through said closing flap; and said first and second suspension members are configured of tubing having an outside diameter less than said predetermined diameter.

7. The motor mount assembly of claim 1 in which:

said coupling portion of said first and second suspension members is insertable within one of said receiving channels a select distance; and including a pin connector assembly insertable through said guideway and said coupling portion.

8. The motor mount assembly of claim 1 in which said thrust transfer portion of said first and second suspension members further comprises a bracket assembly abuttable with said tube portion for thrust transfer thereto.

9. The motor mount assembly of claim 8 in which said bracket includes a horizontal portion extending normally from said thrust transfer portion and a lower abutting bar extending between and connected to said horizontal portion.

10. A float tube system, comprising:

an outboard motor of first given weight having a mounting clamp;

a float tube having a backrest portion with a pocket cavity of given widthwise dimension, a closing flap, a tube portion, and an auxiliary pocket; and a motor mount assembly for supporting said outboard motor upon said float tube, including:

a thrust transfer member dimensioned in correspondence with said pocket cavity for insertion and retention therein having two spaced apart receiving channels with openings facing horizontally outwardly from said pocket cavity when said thrust transfer member is operatively positioned within said backrest pocket cavity, first and second suspension members each having a coupling portion slidably insertable within one of said receiving channels, and a thrust transfer portion depending downwardly therefrom, and a motor mounting block coupled with said first and second suspension members at said thrust transfer portion thereof, and having an upwardly disposed clamp receiving portion for receiving said mounting clamp.

11. The motorized float tube system of claim 10 in which:

said outboard motor is an electric motor having a rechargeable storage battery of second given weight connectable thereto; and said storage battery is located within said auxiliary pocket at a location selected to balance said tube portion under quiescent floating conditions.

12. The motor mount assembly of claim 10 in which said thrust transfer member is formed having a buoyancy effective to maintain said first and second suspension members, said motor mounting block, and said outboard motor afloat in water.

13. The motor mount assembly of claim 12 in which said thrust transfer member is formed of a material selected from the group comprising foam polymers, cork, and wood.

14. The motor mount assembly of claim 10 in which said thrust transfer member is retained within said pocket cavity by said closing flap for thrust transfer to said backrest and tube portion.

15. The motor mount assembly of claim 10 in which said receiving channels are spaced apart first and second tubes fixed to said thrust transfer member and having open guideway ends extendable through said closing flap.

16. The motor mount assembly of claim 15 in which:

each said first and second tube has a first connector opening;

each said coupling portion extends into one of said first and second tubes a predetermined distance and has a second connector opening alignable with said first connector component effective to vary said predetermined distance; and including a connector pin assembly for insertion through said first and second openings.

17. The motor mount assembly of claim 10 in which said thrust transfer portion of said first and second suspension members further comprises a bracket assembly abuttable with said tube portion for thrust transfer thereto.

18. The method for transporting a person upon a body of water, comprising the steps of:

providing a float tube having an auxiliary pocket, a backrest pocket and a support band;

providing a motor mount assembly, including:

a thrust transfer member dimensioned in correspondence with said backrest pocket for insertion and retention therein having two spaced apart receiving channels with openings facing horizontally outwardly from said backrest pocket when said thrust transfer member is operatively positioned therein, first and second suspension members each having a coupling portion slidably insertable within one of said receiving channels, and a thrust transfer portion depending downwardly therefrom, and a motor mounting block coupled with said first and second suspension members at said thrust transfer portion thereof, and having an upwardly disposed clamp receiving portion for receiving said mounting clamp;

providing an electrically powered outboard motor and propeller energizable by a battery;

mounting said outboard motor on said motor mounting block clamp receiving portion;

receiving said battery in said auxiliary pocket;

positioning said float tube on said body of water and said person on said support band; and energizing said outboard motor with said battery.

19. The method of claim 18 further comprising the step of positioning said motor mounting block outwardly from said float tube a distance selected to prevent contact of said person with said propeller.

* * * * *